(12) United States Patent  (10) Patent No.: US 6,547,054 B2
Gamache  (45) Date of Patent: Apr. 15, 2003

(54) CONVEYOR ROLLER WITH TELESCOPING AXLE HAVING TAPERED ENDS

(75) Inventor: Brian L. Gamache, Innsbrook, MO (US)

(73) Assignee: Alvey Systems, Inc., St. Louis, MO (US)

( * ) Notice: Subject to any disclaimer, the term of this patent is extended or adjusted under 35 U.S.C. 154(b) by 0 days.

(21) Appl. No.: 09/918,949

(22) Filed: Jul. 31, 2001

(65) Prior Publication Data

US 2003/0034222 A1 Feb. 20, 2003

(51) Int. Cl.⁷ ............................................... B65G 13/00
(52) U.S. Cl. ..................... 193/37; 193/35 R; 193/35 B
(58) Field of Search ................................. 193/37, 35 R, 193/35 B

(56) References Cited

U.S. PATENT DOCUMENTS

| 833,326 A | 10/1906 | Hiler |
| 1,406,228 A | 2/1922 | Riedel |
| 1,919,495 A | 7/1933 | Allen |
| 1,949,817 A | 3/1934 | Stonefield et al. |
| 2,135,175 A | 11/1938 | Fallon |
| 2,152,076 A | 3/1939 | Menough |
| 2,396,079 A | 3/1946 | Bowen |
| 2,696,283 A | 12/1954 | Barry |
| 2,699,953 A | 1/1955 | Chaddick |
| 2,860,766 A | 11/1958 | Welter |
| 3,215,253 A | 11/1965 | Grantham |
| 3,353,644 A | 11/1967 | McNash et al. |
| 3,402,802 A | 9/1968 | Lint |
| 3,502,197 A | 3/1970 | Kato et al. |
| 3,540,561 A | 11/1970 | Becker et al. |
| 3,599,769 A | 8/1971 | Gardella |
| 3,610,387 A | 10/1971 | Vom Stein |
| 3,713,521 A | 1/1973 | Moritake |

(List continued on next page.)

FOREIGN PATENT DOCUMENTS

| AT | 254243 | 5/1967 |
| DE | 3903051 | 5/1990 |
| EP | 0692440 A1 | 1/1996 |

*Primary Examiner*—Joseph E. Valenza
*Assistant Examiner*—Rashmi Sharma
(74) *Attorney, Agent, or Firm*—Polster, Lieder, Woodruff, Lucchesi, L.C.

(57) ABSTRACT

A conveyor roller having a spring loaded telescoping tubular axle with tapered hexagonal shaped ends allowing quick replacement in the side frame openings of a conveyor when the openings are worn to an oversize. The tapered hex ends also provide for a tight fit between hex ends and hex holes in the frame to lessen relative motion (rattling) between the two surfaces that causes wear and noise. The roller can be installed from either side of the conveyor because the axle is collapsible from either end.

22 Claims, 1 Drawing Sheet

U.S. PATENT DOCUMENTS

| | | |
|---|---|---|
| 3,724,642 A | 4/1973 | De Good |
| 3,751,122 A | 8/1973 | Dubay |
| 3,841,721 A | 10/1974 | Coutant et al. |
| 3,888,343 A | 6/1975 | Snyder |
| 3,899,063 A | 8/1975 | Pollard |
| 4,056,180 A | 11/1977 | Gunti |
| 4,148,386 A | 4/1979 | Bradbury |
| 4,193,493 A | 3/1980 | Ekstrand |
| 4,241,825 A | 12/1980 | Brouwer |
| 4,311,226 A | 1/1982 | Thompson et al. |
| 4,445,257 A | 5/1984 | Delhaes |
| 4,448,302 A | 5/1984 | Weaver et al. |
| 4,664,243 A | 5/1987 | Martin |
| 4,664,252 A | 5/1987 | Galbraith |
| 4,815,588 A | 3/1989 | Katsuragi et al. |
| 5,048,661 A | 9/1991 | Toye |
| 5,080,219 A | 1/1992 | Imai et al. |
| 5,090,558 A | 2/1992 | Hatouchi |
| 5,101,958 A | 4/1992 | LeMay et al. |
| 5,129,507 A | 7/1992 | Maeda et al. |
| 5,240,101 A | 8/1993 | LeMay et al. |
| 5,316,129 A | 5/1994 | Daily |
| 5,421,442 A | 6/1995 | Agnoff |
| 5,645,155 A | 7/1997 | Houghton |
| 5,865,290 A | 2/1999 | Scott |
| 5,875,878 A | 3/1999 | Pierson |
| 6,053,298 A | 4/2000 | Nimmo et al. |

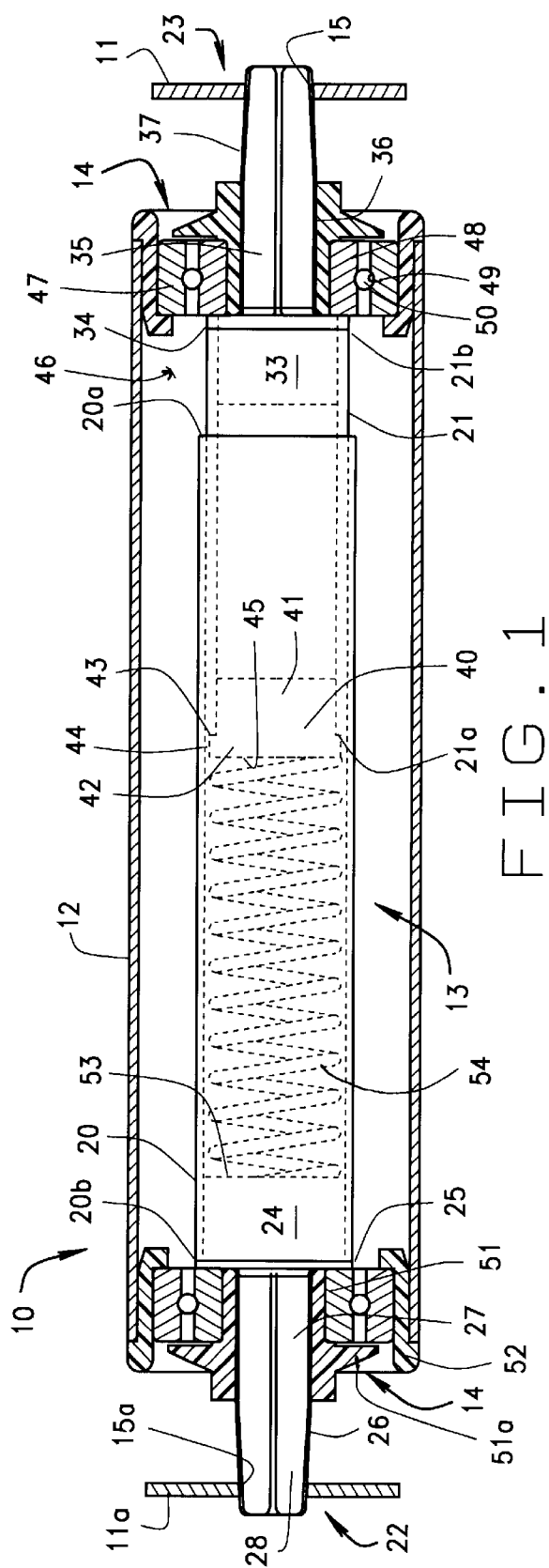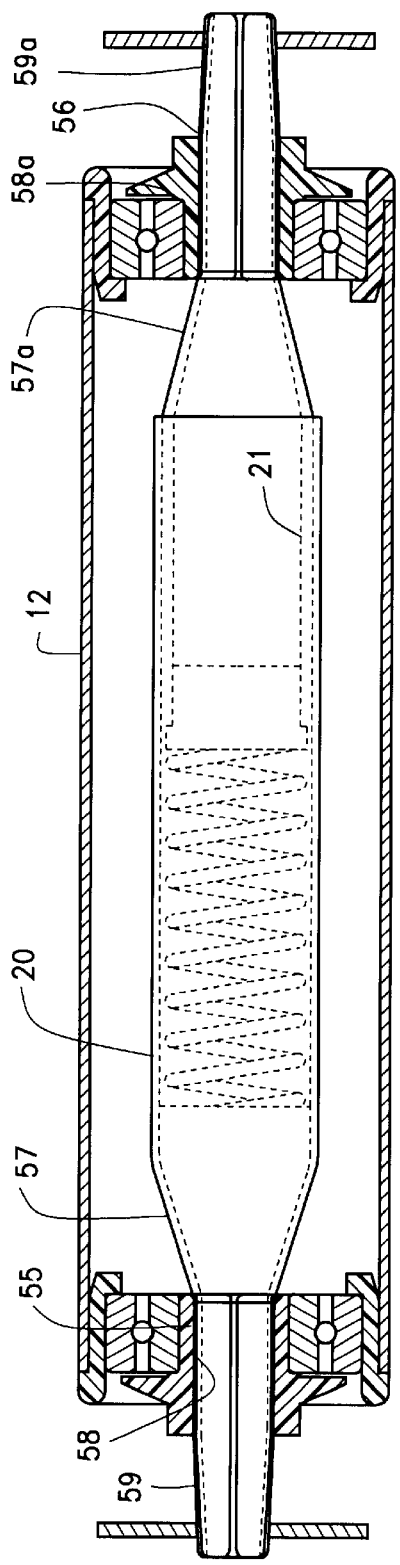

CONVEYOR ROLLER WITH TELESCOPING AXLE HAVING TAPERED ENDS

CROSS-REFERENCE TO RELATED APPLICATIONS STATEMENT REGARDING FEDERALLY SPONSORED RESEARCH OR DEVELOPMENT

Not Applicable

BACKGROUND OF THE INVENTION

1. Field of the Invention

The present invention relates generally to rollers for roller conveyors and more specifically to a conveyor roller with a telescoping shaft having tapered ends.

2. Description of Related Art

A conveyor roller generally is rotatably mounted on a shaft, which, in turn, is mounted in openings located in laterally spaced side frame members of the conveyor.

The shaft is generally loosely positioned in the mounting aperture and vibration and loading conditions of the roller causes the shaft to bounce, causing noise and wear on both the shaft and the aperture. Over time, the wear from shaft vibration results in enlargement of the mounting aperture, creating an even looser fit between the shaft and the frame and generating even more noise. Eventually, the shaft vibration causes the frame to cut through the roller shaft, resulting in the roller dropping out of the frame.

It would accordingly be desirable to modify the mounting of a roller shaft in a conveyor frame to minimize the vibration of the shaft in the frame and thereby lessen the noise which is produced and the wear which occurs on both the shaft and the frame.

It also is desirable to be able to replace rollers easily when they become worn. It further is desirable to be able to assemble the roller axles by hand immediately prior to being placed into the roller assembly. This eliminates the use of tools required for crimping, drilling, pinning, or staking of the axle.

BRIEF SUMMARY AND OBJECTS OF THE INVENTION

According to this invention, the mounting of a conveyor roller to the conveyor frame members is improved by the use of a roller shaft which is telescoping and has tapered ends. The roller shaft preferably is of two-piece telescoping tubular construction with a spring positioned inside the telescoping tubular members urging the members away from each other. The tubular construction of the shaft or axle provides added strength in the middle of the span compared to a solid hex axle and keeps the axle aligned with the bearings without being distorted out of alignment when subjected to a load.

The ends of the shaft are tapered outwardly and engage the mounting holes in the conveyor frame to eliminate play between the shaft and the mounting holes. The tapered ends allow replacement rollers to be placed into mounting holes that have been enlarged by wear and still seat firmly.

The tapered ends of the shaft and the mounting holes are shaped to prevent rotation of the shaft. Preferably they are both hexagonally shaped, but can be square or round with one or more flats.

Other objects and advantages of the present invention will become apparent from the following description and the accompanying drawings which are merely illustrative of the invention.

BRIEF DESCRIPTION OF THE SEVERAL VIEWS OF THE DRAWINGS

In the drawings, wherein like numbers refer to like parts wherever they occur:

FIG. 1 is a partial vertical sectional view showing a roller and bearing assemblies in section and a telescoping axle in detail; and FIG. 2 is a partial vertical sectional view of a modification of the invention showing a roller and bearing assemblies in section and a telescoping axle in detail.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the constructions without departing from the scope of the invention, it is intended that all matter contained in the description or shown in the accompanying drawings shall be interpreted as illustrative and not in a limiting sense.

FIG. 1 shows a conveyor roller assembly 10 mounted between conveyor frame members 11,11a. The roller assembly 10 comprises a cylindrical roller tube 12 rotatably mounted on a shaft or axle assembly 13 by bearing assemblies 14. The frame members have openings 15,15a therein to mount the roller assemblies 10.

The shaft assembly 13 is the essential feature of this invention and includes a larger tubular axle member 20 which accepts a telescoping smaller tubular member 21 in a snug sliding fit at their inboard ends 20a,21a. A large shaft end adaptor 22 is press fitted into the outboard end 20b of the larger shaft tube member 20. A small end adaptor 23 is press fitted into the outboard end 21b of the smaller shaft tube member 21.

The large end adaptor 22 includes a shank area 24 which is press fit into the outboard end of the large axle tube 20, an enlarged shoulder 25 which engages the outboard end 20b, and a hexagonal end portion or spindle 26. The end portion 26 has a straight portion 27 which connects to the shoulder 25 and an outwardly tapered end portion 28 which is designed to non-rotatably engage the frame opening 15a which also is hexagonal in shape.

The small end adaptor 23 includes a shank area 33 which is press fitted into the outboard end of the small axle tube 21, an enlarged shoulder 34 which engages the outboard end 21b, and a hexagonal end portion or spindle 35. The end portion 35 has a straight portion 36 which connects to the shoulder 34 and an outwardly tapered end portion 37 which is designed to non-rotatably engage the frame opening 15 which also is hexagonal in shape.

While the adaptors 22,23 are called large end and small end, respectively, the only difference is that the large end adaptor shank 24 is larger in diameter to fit the larger outer tube 20. The small end adaptor shank 33 is smaller in diameter than the shank 24 to fit the inside diameter of the smaller inner tubular axle member 21. The adaptors 22,23 are made from powdered metal.

The bearing assemblies 14 each include an antifriction bearing 46 in the form of a single row ball bearing which has an outer race or ring 47, and an inner race or ring 48 which define a raceway 49 which receives rolling elements 50 in the form of balls. The bearing assemblies 14 also include an inner collar 51 having a depending flange 51a and a sleeve or outer collar 52. The antifriction bearing 46 is retained between the inner collar 51 and the sleeve 52 and the bearing assemblies 14 are press fitted into the ends of the roller tube 12. The collars 51,52 are polymeric materials. The inner collars 51 have hexagonal inner surfaces which mate with the hexagonal axle areas 27,35 to rotatably lock the inner races 48 to the axle 13.

A plug 40 is pressed into the inboard end 21a of the inner tubular member 21. The plug 40 has a reduced body portion 41 which engages the inner surface of the tubular member 21 and a head 42. The head 42 has an internal shoulder 43 which engages the tubular end 21a, an annular surface 44 whose outer diameter is slightly less than the outer diameter of the inner tubular member 21, so that it is freely movable through the outer tubular member 20, and an external surface 45 within the outer tubular member 20.

The large end adaptor shank 24 has an internal surface 53 in the outer tubular member 20 which is aligned with and opposed to the plug external surface 45. Positioned between and engaging the surfaces 45,53 is a resilient means such as the shown helical spring 54. The spring 54 urges the outer tubular axle member 20 and the inner tubular axle member 21 apart, thus facilitating engagement of the end adaptors 22,23 into the frame openings 15a,15 respectively.

Another form of the invention is shown in FIG. 2. In this form, the outer and inner axle tubes 20,21 have their ends 55,56 respectively swaged from round to hex shape. The end 55 has a transitional area 57 from the axle diameter to a bearing seat area 58, and then a tapered hexagonal area 59 to the end of the axle. The inner tube end 56 has a similar transitional area 57a, a bearing seat 58a, and a tapered hexagonal end 59a.

The use of the tapered hex ends on the spindles combined with the frame hexagonally shaped openings provide a tight fit between the hex ends and the frame, and thus less relative motion between the rollers and the frame to reduce wear and noise. Also, the rollers can be installed from either side of the conveyor frame because the axle is collapsible from either end.

This invention is intended to cover all changes and modifications of the examples of the invention herein chosen for purposes of the disclosure which do not constitute departures from the spirit and scope of the invention.

What is claimed is:

1. A roller for a conveyor comprising:
   (a) a continuous telescoping roller shaft adapted to be non-rotatably mounted in opposed mounting openings, in a conveyor frame, and
   (b) a cylindrical roller tube rotatably mounted on the shaft,
   (c) wherein the shaft extends within the roller tube continuously between the opposed conveyor frame openings and comprises telescoping tubular members having tapered spindles on their outer ends, said tapered spindles adapted to engage said opposed frame openings, and resilient means positioned in one of the tubular members and urging the tubular members apart, the tubular members being telescoping to shorten the roller shaft and permit its insertion into a conveyor frame and extendible to seat the spindles in the frame openings.

2. The roller of claim 1 wherein the shaft tubular members are circular in cross-section.

3. The roller of claim 1 wherein the spindles are hexagonal in cross-section.

4. The roller of claim 1 wherein each of the spindles has a longitudinal bearing seat between the tubular member and the tapered end.

5. The roller of claim 4 wherein the bearing seats are uniform in cross-section.

6. The roller of claim 1, including bearings having outer raceways fixed in the ends of the roller tube and rotatable therewith, inner raceways seated on the spindles, and rolling elements positioned between the inner and outer raceways.

7. The roller of claim 6 wherein the outer raceways are seated in polymeric sleeves fixed in the ends of the roller tube and the inner raceways are seated in polymeric collars rotatably positioned on the spindles, the spindles being axially movable through the inner raceways.

8. The roller of claim 1 wherein the spindles have shanks fixed in the outboard ends of the tubular members, a plug in the inboard end of the smaller tubular member and a helical spring positioned in the larger tubular member between the plug and the shank of the larger tubular member urging the tubular members axially apart.

9. The roller of claim 1 wherein the spindles are formed from powdered metal.

10. The roller of claim 1 wherein the spindles are integral with the tubular members and are formed by swaging the ends of the tubular members to form tapered ends.

11. A conveyor assembly comprising:
    (a) a pair of parallel laterally spaced frame members having a series of opposed sets of longitudinally spaced openings therein,
    (b) roller assemblies mounted between the frame members, each roller assembly including a tubular roller and a telescoping tubular shaft positioned within the roller tube and extending continuously between a set of opposed frame openings, said shaft having spindles on the ends non-rotatably positioned in said set of frame openings, said tubular roller being rotatably mounted on the shaft, and
    (c) wherein the shaft comprises telescoping tubular members having tapered spindles on their outer ends, said tapered spindles adapted to engage said opposed frame openings, and resilient means positioned in one of the tubular members and urging the tubular members apart, the tubular members being collapsible to shorten the roller shaft and permit its insertion into a conveyor frame and extendible to seat the spindles in the frame openings.

12. The assembly of claim 11 wherein the shaft tubular members are circular in cross-section.

13. The assembly of claim 11 wherein the spindles are hexagonal in cross-section.

14. The assembly of claim 11 wherein each of the spindles has a longitudinal bearing seat between the tubular member and the tapered end.

15. The assembly of claim 14 wherein the bearing seats are uniform in cross-section.

16. The assembly of claim 11, including bearings having outer raceways fixed in the ends of the roller tube and rotatable therewith, inner raceways seated on the spindles, and rolling elements positioned between the inner and outer raceways.

17. The assembly of claim 16 wherein the outer raceways are seated in polymeric sleeves fixed in the ends of the roller tube and the inner raceways are seated in polymeric collars positioned on the spindles and rotatable with the spindles, the spindles being axially movable through the inner raceways.

18. The assembly of claim 11 wherein the spindles have shanks fixed in the outboard ends of the tubular members, a plug in the inboard end of the smaller tubular member and a helical spring positioned in the larger tubular member between the plug and the shank of the larger tubular member urging the tubular members axially apart.

19. The assembly of claim 11 wherein the spindles are formed from powdered metal.

20. The assembly of claim 11 wherein the spindles are integral with the tubular members and are formed by swaging the ends of the tubular members to form tapered ends.

21. A roller for a conveyor comprising:
(a) a telescoping roller shaft adapted to be non-rotatably mounted in opposed mounting openings in a conveyor frame,
(b) a cylindrical roller tube rotatably mounted on the shaft, wherein the shaft comprises telescoping tubular members having tapered spindles on their outer ends, said tapered spindles adapted to engage opposed frame openings, the tubular members being telescoping to shorten the roller shaft and permit its insertion into a conveyor frame and extensible to seat the spindles in the frame openings, the spindles having shanks fixed in the outboard ends of the tubular members, and
c) a helical spring positioned in the larger tubular member between the smaller tubular member and the larger tubular member urging the tubular members axially apart.

22. A conveyor assembly comprising:
(a) a pair of parallel laterally spaced frame members having a series of opposed sets of longitudinally spaced openings therein,
(b) roller assemblies mounted between the frame members, each roller assembly including a telescoping tubular shaft having spindles on the ends non-rotatably positioned in the frame openings and a tubular roller rotatably mounted on the shaft,
(c) wherein the shaft comprises telescoping tubular members having tapered spindles on their outer ends, said tapered spindles adapted to engage opposed frame openings, the tubular members being collapsible to shorten the roller shaft and permit its insertion into a conveyor frame and extendible to seat the spindles in the frame openings, the spindles having shanks fixed in the outboard ends of the tubular members, and
d) a helical spring positioned in the larger tubular member between the larger tubular member and the smaller tubular member urging the tubular members axially apart.

* * * * *